United States Patent [19]

Wells

[11] 4,221,538
[45] Sep. 9, 1980

[54] ROTARY TRANSDUCERS

[75] Inventor: Alan A. Wells, Mepal, Nr. Ely, England

[73] Assignee: The Queen's University of Belfast, Ireland

[21] Appl. No.: 850,498

[22] Filed: Nov. 11, 1977

[30] Foreign Application Priority Data

Nov. 13, 1976 [GB] United Kingdom ............... 47365/76

[51] Int. Cl.³ ............................................ F01D 15/10
[52] U.S. Cl. ........................................ 415/2; 415/7; 416/223 R
[58] Field of Search ........................................ 415/2–4, 415/7, 149 A; 9/8 R; 416/223; 290/43, 44, 53, 54; 417/315, 334, 335

[56] References Cited

U.S. PATENT DOCUMENTS

| 1,835,018 | 12/1931 | Darrieus | 416/111 |
| 3,064,137 | 11/1962 | Corbett, Jr. et al. | 290/44 |
| 3,912,938 | 10/1975 | Filipenco | 290/53 |
| 3,988,592 | 10/1976 | Porter | 290/53 |
| 4,078,382 | 3/1978 | Ricafranca et al. | 290/53 |

FOREIGN PATENT DOCUMENTS

| 540347 | 7/1922 | France | 290/53 |
| 745084 | 2/1956 | United Kingdom | 416/140 |

OTHER PUBLICATIONS

New Zealand Energy Journal, vol. 49, No. 4, pp. 57–58, Apr. 1976.

Primary Examiner—Everette A. Powell, Jr.
Attorney, Agent, or Firm—Bacon & Thomas

[57] ABSTRACT

A rotary transducer adapted to be driven in the same direction by air flow therethrough in either axial direction comprises a rotor having blades of aerofoil cross-section which are fixed with their planes of zero lift normal to the axis of the rotor. An apparatus for use in extracting energy from the waves of the sea utilizes such a transducer.

25 Claims, 5 Drawing Figures

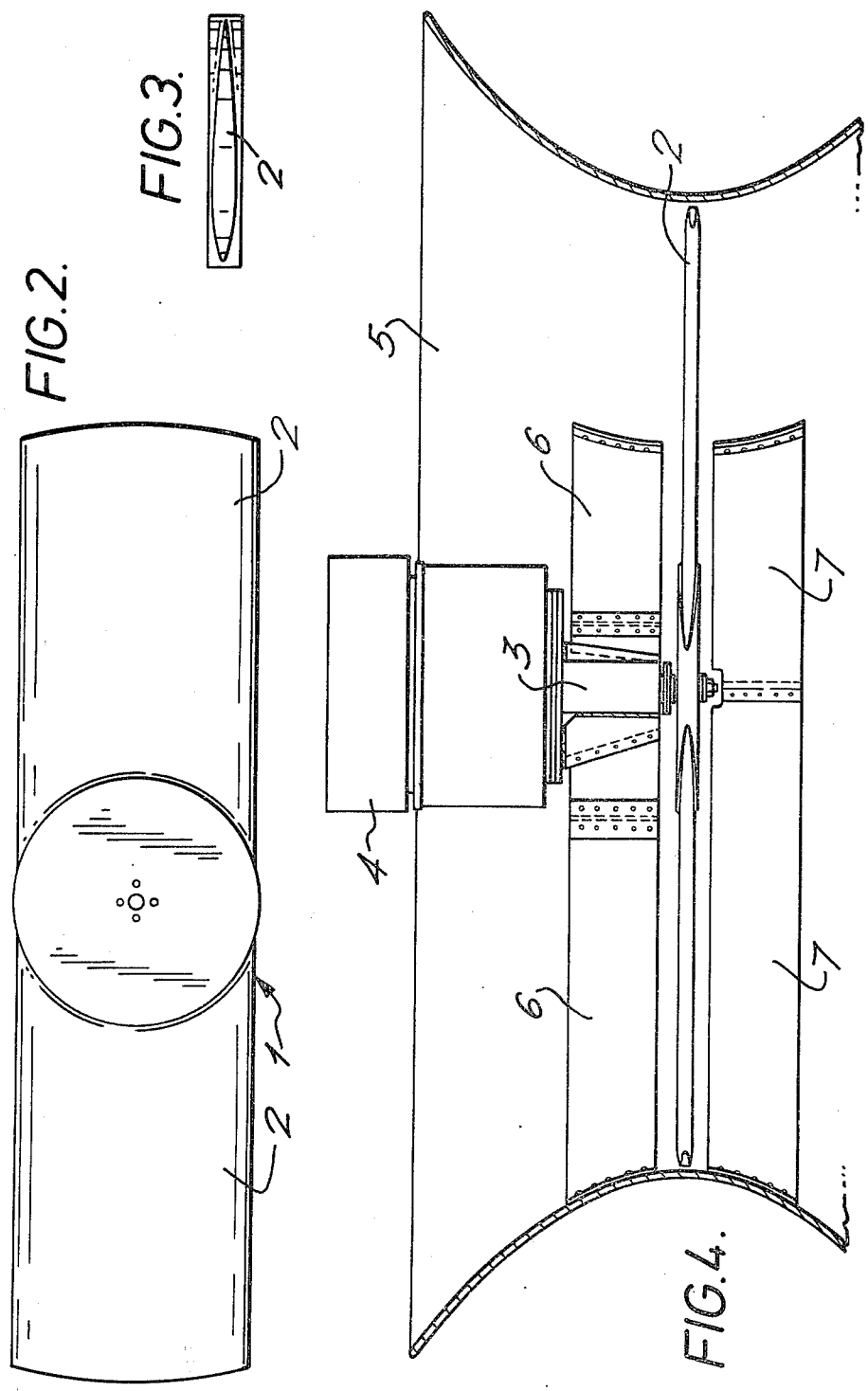

ROTARY TRANSDUCERS

This invention relates to air-driven rotary transducers and particularly but not exclusively to the use of such a transducer to extract energy from the motion of the waves of the sea.

It is known that it is possible to extract energy from sea waves by allowing the waves to produce a fluctuating water level in a chamber which is preferably open to the atmosphere, thus displacing air from and drawing air into the chamber, the flow of air thus created being used to drive an air turbine. Such a chamber can be provided in a floating buoy, or be part of a larger floating structure, or of a marine structure secured to the sea bed, or of a shore structure accessible to the waves.

It is of course necessary that the rotor of such a device should be driven only in one direction of rotation during operation, if the extraction of useful power from its rotation is to be a practical proposition.

One proposal is disclosed in British Patent Specification No. 1,014,196. This Specification discloses an arrangement which utilises a turbine of a kind which will be driven in opposite directions of rotation by air impinging on it from respectively opposite axial directions. This necessitates an arrangement of flap valves to regulate the flow of air, so that the air always flows through the rotor in the same axial direction and thereby always drives it in the same direction of rotation. The presence of the flap valve arrangement necessitates an undesirably complicated structure and also reduces the efficiency of the turbine.

The apparatus of British Patent Specification No. 1,449,740 avoids the use of flap valves such as those described above, by using a turbine having "bucket-type" rotor blades onto which the flow of air in both axial directions is directed by means of stator blades on both sides of the turbine, so that the air impinges on the rotor blades with a substantial component of its velocity normal to the axis about which the rotor rotates, so that the turbine always rotates in the same direction. Such a turbine will have a relatively low peripheral speed since the speed of the turbine blades will be limited to a value somewhat less than that of the impinging air flow, and whilst this turbine is suitable for, for example, powering a navigating light on a buoy, it is less so for generating power of a magnitude which is worth transmitting to the shore; in particular the low rotation speed makes such a device prone to undesirable irregularity of output and even to stalling.

According to the present invention there is provided a rotary transducer to be driven by air flow therethrough, comprising a rotor having a plurality of radially extended blades each of which is of symmetrical aerofoil cross-section and is fixed with its plane of zero lift (or chordwise axis of symmetry) normal to the axis of the rotor, whereby flow of air through the rotor in either axial direction causes the rotor to rotate always in the same direction of rotation.

When the rotor of such a transducer is rotating and there is an axial flow of air through the rotor in either direction, the direction of the incident air relative to a rotor blade is as shown in FIG. 1 of the drawings. In FIG. 1 the rotor blade is shown in cross-section and the velocity of the particular portion of the blade shown is V, thus producing an effective flow of air with a velocity component V in the direction opposite to the direction of rotation, as shown in the drawing. When air is flowing axially downwardly through the rotor with a velocity $U_1$ the resultant direction of air incident on the rotor blade is $I_1$. When air is flowing axially upwardly with a velocity $U_2$, the direction of air incident on the rotor blade is $I_2$. A lift is created in the direction normal to the incident air at the blade; $L_1$ with the air flowing downwardly and $L_2$ with the air flowing upwardly. It will be seen that both $L_1$ and $L_2$ have a component in the plane of rotation of the blade which is positive in the direction of rotation of the rotor blade. In this manner, regardless of the axial direction of the flow of air incident on the rotor, the rotor will always be rotated in the same direction.

When the rotor is stationary, the rotor will start to rotate when an air flow occurs in the axial direction of the rotor. This is because the blades of the rotor have a larger radius of curvature at the leading edge than at the trailing edge thereof, and the reduction of pressure caused by the flow of air will act on a larger area at the leading edge of the blade than at the trailing edge. This phenomenon produces only a weak force, but it is sufficient to start rotation of the rotor, whereafter the mechanism outlined above comes into effect. It will thus be appreciated that a comparatively thick, blunt blade would have good self-starting characteristics. However, a thinner blade capable of operating at high speed is preferred as providing a more efficient rotor. The blade profile at present preferred is that referred to as NACA 64/009, NACA being the United States National Advisory Committee on Aeronautics. This is, however, only one example of many similar profiles which could be used, for example NACA 0009 and 0012.

The solidity factor of the rotor, which is defined as that proportion of the area of the circle swept by the rotor blades which is occupied by the rotor blades, is preferably less than 0.5, more preferably in the range 0.3 to 0.4.

The transducer may have guide vanes on at least one side of the rotor. Preferably, guide vanes are arranged on both sides of the rotor. Such guide vanes cause air to flow substantially axially through the rotor. The guide vanes may lie in planes containing the axis of the rotor, but they are preferably inclined to such planes at an angle of up to 30°, the edges of the guide vanes adjacent the rotor being more advanced in the direction of rotation of the rotor than the opposite edges thereof.

The invention further provides apparatus for use in extracting energy from the waves of the sea, which apparatus comprises means for surrounding a portion of the surface of the sea in use, and a rotary transducer as set forth above arranged to be driven by the movement of air produced by wave motion in said portion of the surface of the sea.

Preferably the said surrounding means comprises walls defining a chamber having an open bottom, said rotary transducer being in air flow communication with said chamber.

Preferably the said rotary transducer is located in a passage connecting said chamber to the atmosphere.

Such apparatus preferably comprises a floating buoy, although it could form part of a shore structure, part of a larger floating structure or be connected to the sea bed. The device is preferably used to generate electricity by means of a generator driven by the rotor, although it could also be used to drive a pump or other suitable means of power conversion.

When such as apparatus is in use the water confined by it heaves in cyclic motion. As the water level rises and falls air is drawn through the rotor and, owing to the construction of the rotor according to the invention, air flow in either direction always causes the rotor to rotate in the same direction.

Preferably the transducer is mounted in the throat of a convergent-divergent nozzle with its axis of rotation coincident with the axis of the nozzle.

The lift or axial thrust which is generated at the rotor is proportional to the instantaneous axial velocity of the air through it, averaged over its cross-section, so that linear damping is impressed upon the air column within the buoy chamber, hence upon the heaving motion of the buoy itself, which motion is also controlled by the mass of the buoy (including that of entrained water), the stiffness related to heaving motion (arising from the waterline cross-section of the buoy), the damping as defined above, and the cyclic heave disturbing force from the incident wave system. Insofar as the wave system has a characteristic spectrum of wave components of different wavelengths and angular velocities, the natural frequency of heave oscillation of the buoy should correspond with that of the wave component having the greatest product of power potential and probability of occurrence (over an annular or longer period), or somewhat greater natural frequency than this, so that a suitable compromise is obtained between three factors namely, exploitation of power amplification by resonance, efficient power extraction from the more probable but less powerful high frequency waves, and a high degree of rejection of power from non-resonant storm waves of low frequencies.

In an embodiment of the invention to be described, the optimal inertial mass of the buoy is larger than can be accommodated within the buoyancy space and a subsidiary chamber, which is flooded and to which the anchor cable is secured, is attached below the buoy. The extra inertial mass is thereby made to be approximately neutrally buoyant. Such an ancillary mass to which the anchor cable is secured can then also provide the facility of a kedge whereby the anchor cable force is constrained towards the horizontal at all times (such that the anchor is not dragged from its penetrated position), and provision is allowed for limited horizontal as well as vertical cyclic motion of the buoy, due to wave action.

A set of guide vanes is preferably arranged at least on that side of the rotor in communication with said chamber. This is because when air is drawn through the rotor into the chamber, a swirl is induced in the air, so that when this air is forced out of the chamber, this swirl tends to persist. It is therefore desirable to improve the efficiency of the rotor by eliminating, or at least substantially reducing, this effect.

A plurality of buoys as described above may be interconnected to form a straight or curved line, or a ring. However, the buoys are more efficient when moored in isolation, and it is therefore preferred that the buoys are spaced from one another by approximately six buoy diameters.

It may be desirable to provide a buoy having a plurality of rotary transducers working in parallel air streams. This would allow the air capacity to be increased whilst keeping the air flow over the blades of each rotor subsonic. This arrangement also has the advantage that the flow to one or more of the transducers could be shut off when the wave height is small, whereby the range of peak flow rates for which there is useful work output is effectively doubled.

In addition it may also be desirable to provide a plurality of transducers in series on a common shaft, in order to obtain an increased pressure drop.

In the accompanying drawings:

FIG. 2 shows a plan of an embodiment of a rotary transducer according to the invention;

FIG. 3 shows an end elevation of the apparatus of FIG. 2;

FIG. 4 shows an transducer incorporating the apparatus of FIGS. 2 and 3 mounted in a buoy.

Figure 1:
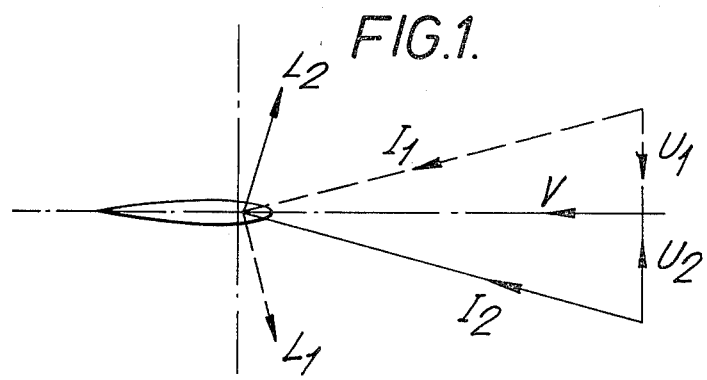
FIG. 1 is a diagram illustrating the theory of the mode of operation of the rotary transducer according to the invention.

As shown in FIGS. 2 and 3, a rotary transducer 1 according to the invention comprises two fixed blades 2, each of which has an aerofoil cross-section. The blades are arranged so that the plane of zero lift (horizontal in FIG. 3) lies in a plane normal to the axis of the rotor; that is, the chords of the blades are aligned in the direction of rotation.

FIG. 4 shows the apparatus of FIGS. 2 and 3 bolted to the shaft 3 of an electrical generator 4. The geneator is mounted in a convergent-divergent nozzle 5 by means of three guide vanes 6. The generator is mounted in such a position that the rotor is situated at the throat of the nozzle. A further arrangement of three guide vanes 7 is mounted in the nozzle below the rotor 1. The vanes 6 and 7 serve to reduce swirl in air flows passing axially through the nozzle. Such air flows serve to rotate the rotor as described above, the rotor rotating the shaft 3 whereby the generator 4 produces power which can be collected in a known manner.

Figure 5:
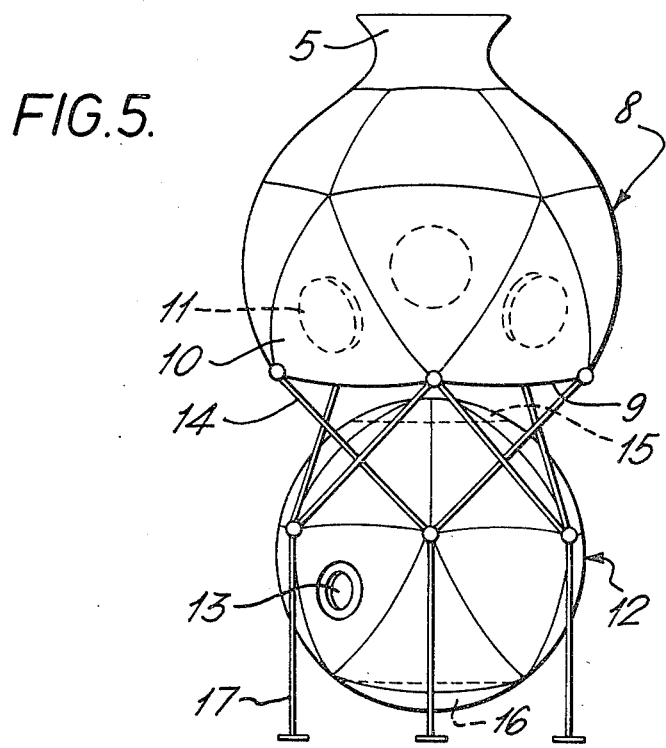
FIG. 5 is a general view of a buoy according to the invention.

FIG. 5 shows a buoy 8 incorporating the arrangement shown in FIG. 4. The buoy 8 is quasi-spherical, having the convergent-divergent nozzle 5 described above at the top and having an open base 9. The buoy is assembled from a plurality of sections 10, made of fibre-reinforced material. Glass or other strong fibres and a polymeric or inorganic cement matrix are suitable. At least some of the sections 10 are provided with a buoyancy pad 11 in the interior of the buoy. The buoyancy pads may be made of rigid polymeric foam. The buoy 8 is secured to a subsidiary chamber 12 by means of rigid members 14. This chamber is flooded, the water entering the chamber through a port 13 in order to increase the inertial mass of the buoy. Moreover, since substantially all of this mass is contributed by the water contained in the chamber 12, the mass is neutrally buoyant. In order to assist in maintaining the orientation of the buoy in use, caps 15 and 16 of rigid polymeric foam and concrete respectively may be provided in chamber 12. Legs 17 are provided so that the buoy may be stood upright on the ground.

When the buoy is to be used, it is towed out to the desired location, the chamber 12 is flooded and the buoy is moored by means of mooring chains attached to the chamber 12. As waves pass the buoy, the water column contained in the buoy 8 oscillates, thus pumping air alternatively upwardly and downwardly through the nozzle 5. This causes the rotor 1 to rotate as described above, thus causing generator 4 to generate electricity.

What I claim is:

1. Apparatus for extracting energy from a reversible fluid flow, comprising means supporting a rotary transducer in said flow, said transducer including a rotor having its axis parallel to the direction of fluid flow and being rotatable about said axis; a plurality of rotor blades extending radially from said rotor, each of said blades being of substantially symmetrical airfoil cross-section; and means rigidly mounting each of said blades on said rotor with the plane of zero lift of the blades permanently normal to the axis of the rotor so as to provide for continuous rotation of the rotor in a single chosen direction of rotation in response to reversible fluid flow.

2. Apparatus as claimed in claim 1, wherein the transducer has a solidity factor of less than 0.5.

3. Apparatus as claimed in claim 2, wherein the transducer has a solidity factor in the range of 0.3 to 0.4.

4. Apparatus as claimed in claim 1, including only two of said blades mounted on said rotor.

5. Apparatus as claimed in claim 1, including an electrical generator and means drivingly connecting said generator to said rotor.

6. Apparatus as claimed in claim 1, including means supporting a plurality of guide vanes on at least one side of the rotor, said guide vanes directing fluid onto said blades.

7. Apparatus as claimed in claim 6, including means supporting said guide vanes on both sides of the rotor.

8. Apparatus as claimed in claim 7, wherein the guide vanes are inclined to planes containing the axis of the rotor, at an angle of up to 30°.

9. Apparatus as claimed in claim 7, wherein the guide vanes lie in planes containing the axis of the rotor.

10. Apparatus as claimed in claim 6, including an electrical generator supported by the said guide vanes, and means drivingly connecting said generator to said rotor.

11. Apparatus as claimed in claim 1, including means defining a passageway in which said transducer is positioned.

12. Apparatus as claimed in claim 11, wherein said passageway is in the form of a convergent-divergent nozzle and the transducer is positioned with the rotor blades in the throat of said nozzle.

13. Apparatus as claimed in claim 11, including pumping means connected to said passageway and arranged to provide reversible fluid flows therethrough.

14. Apparatus as claimed in claim 13, wherein said pumping means includes a housing enclosing an oscillating body of liquid acting on the fluid.

15. Apparatus as claimed in claim 14, wherein said housing and said passageway are portions of a buoy adapted to float on water, surface wave motion of the water causing oscillation of said body of liquid, and said fluid being air.

16. Apparatus as claimed in claim 15, wherein said buoy has an open bottom and said body of liquid consists of water within a space defined by walls of the buoy above the open bottom, said air being above said water within said space.

17. Apparatus as claimed in claim 14, wherein the housing is adapted to surround a portion of the surface of a body of water subject to surface wave action, the surrounded portion of water constituting said oscillating buoy of liquid.

18. Apparatus for extracting energy from surface wave action of a body of water, said apparatus including a buoy adapted to float on the body of water; said buoy including a housing for entraining a driving liquid, wave motion of the body of water causing oscillation of the driving liquid, and further including a passageway in fluid communication with the interior of the housing, oscillation of the driving liquid causing a working fluid to flow through the passageway in alternating directions; and a rotary transducer mounted in said passageway, said transducer comprising a rotor having its axis parallel to the direction of fluid flow through the passageway and being rotatable about said axis, a plurality of rotor blades extending radially from said rotor, each of said blades being of substantially symmetrical airfoil cross-section; and means rigidly mounting each of said blades on said rotor with the plane of zero lift of the blades permanently normal to the axis of the rotor so as to provide for continuous rotation of the rotor in a single chosen direction of rotation in response to said alternating fluid flow.

19. Apparatus as claimed in claim 18, wherein said working fluid is air.

20. Apparatus as claimed in claim 19, wherein said driving liquid is water.

21. Apparatus as claimed in claim 20, wherein said housing has an open bottom, walls of the housing being adapted to surround a portion of the water on which the buoy floats, the air being above said water.

22. Apparatus as claimed in claim 19, wherein said passageway communicates the interior of the housing with atmosphere.

23. Apparatus as claimed in claim 22, wherein said passageway is in the form of a convergent-divergent nozzle, the rotary transducer being mounted in the throat of said nozzle.

24. Apparatus as claimed in claim 18, including a subsidiary chamber connected to said buoy and adapted to be flooded to increase the inertial mass of the buoy.

25. Apparatus for extracting energy from surface wave action of a body of water, said apparatus including a housing for surrounding a portion of the surface of a body of water subject to wave action and a portion of air aove the surface of the water; a passageway in fluid communication with the interior of said housing, wave motion of said body of water causing air to flow in alternating directions through the passageway; and a rotary transducer disposed in said passageway, said transducer including a rotor having its axis parallel to the direction of air flow and being rotatable about said axis, a plurality of rotor blades extending radially from said rotor, each of said blades being of substantially symmetrical airfoil cross-section, and means rigidly mounting each of said blades on said rotor with the plane of zero lift of the blades permanently normal to the axis of the rotor, so as to provide for continuous rotation of the rotor in a single chosen direction of rotation in response to the alternating flow of air through the passageway.

* * * * *